United States Patent
Tanaka et al.

(10) Patent No.: US 6,694,724 B2
(45) Date of Patent: Feb. 24, 2004

(54) EXHAUST EMISSION CONTROL APPARATUS OF INTERNAL COMBUSTION ENGINE AND CONTROL METHOD OF THE SAME

(75) Inventors: Hiroshi Tanaka, Susono (JP); Yasuyuki Irisawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/284,169

(22) Filed: Oct. 31, 2002

(65) Prior Publication Data

US 2003/0089101 A1 May 15, 2003

(30) Foreign Application Priority Data

Nov. 13, 2001 (JP) ........................................ 2001-347718

(51) Int. Cl.⁷ .................................................. F01N 3/00
(52) U.S. Cl. .............................. 60/274; 60/276; 60/285; 60/301
(58) Field of Search .......................... 60/274, 276, 285, 60/295, 301

(56) References Cited

U.S. PATENT DOCUMENTS

| | | | | |
|---|---|---|---|---|
| 5,201,802 A | * | 4/1993 | Hirota et al. | 60/276 |
| 5,595,060 A | * | 1/1997 | Togai et al. | 60/274 |
| 5,657,625 A | * | 8/1997 | Koga et al. | 60/274 |
| 5,771,686 A | | 6/1998 | Pischinger et al. | |
| 6,026,640 A | * | 2/2000 | Kato et al. | 60/274 |
| 6,134,883 A | * | 10/2000 | Kato et al. | 60/274 |
| 6,360,529 B1 | * | 3/2002 | Surnilla et al. | 60/274 |
| 6,434,928 B1 | * | 8/2002 | Manaka | 60/274 |
| 6,453,666 B1 | * | 9/2002 | Surnilla et al. | 60/285 |
| 6,487,849 B1 | * | 12/2002 | Bidner et al. | 60/286 |
| 6,539,704 B1 | * | 4/2003 | Surnilla et al. | 60/274 |
| 6,594,985 B2 | * | 7/2003 | Surnilla et al. | 60/277 |
| 6,594,989 B1 | * | 7/2003 | Hepburn et al. | 60/286 |

FOREIGN PATENT DOCUMENTS

| | | |
|---|---|---|
| DE | 100 03 612 A1 | 8/2001 |
| EP | 1 087 119 A1 | 3/2001 |
| EP | 1 134 396 A1 | 9/2001 |
| JP | A 7-166851 | 6/1995 |
| JP | A 11-107828 | 4/1999 |

* cited by examiner

Primary Examiner—Thomas Denion
Assistant Examiner—Diem Tran
(74) Attorney, Agent, or Firm—Oliff & Berridge, PLC

(57) ABSTRACT

The exhaust emission control apparatus is provided with a NOx catalyst for purifying exhaust gas flowing out of an internal combustion engine, and a NOx sensor for detecting a NOx concentration in exhaust gas flowing out of the NOx catalyst. The internal combustion engine and the exhaust emission control apparatus are mounted on a vehicle. The exhaust emission control apparatus calculates a total outflow amount of NOx flowing out of the NOx catalyst obtained while the vehicle runs for a predetermined distance based on a NOx concentration detected by the above-mentioned NOx sensor, calculates a NOx outflow amount per unit running distance based on the total NOx outflow amount, and supplies the NOx catalyst with exhaust gas with a rich air-fuel ratio when a NOx outflow amount per unit running distance exceeds a predetermined amount.

15 Claims, 9 Drawing Sheets

EXHAUST EMISSION CONTROL APPARATUS OF INTERNAL COMBUSTION ENGINE AND CONTROL METHOD OF THE SAME

INCORPORATION BY REFERENCE

The disclosure of Japanese Patent Application No. 2001-347718 field on Nov. 13, 2001 including the specification, drawings and abstract are incorporated herein by reference in their entirety.

BACKGROUND OF THE INVENTION

1. Field of the Invention

The invention relates to an exhaust emission control apparatus of an internal combustion engine, and control method of the same.

2. Description of the Related Art

Currently, an adsorption reduction type NOx catalyst is widely known as a catalyst. The adsorption reduction type NOx catalyst absorbs NOx in exhaust gas when an air-fuel ratio of exhaust gas flowing thereinto is lean, as the NOx catalyst which is to purify nitrogen oxides (NOx) in exhaust gas emitted from an internal combustion engine. Also, the adsorption reduction type NOx catalyst releases the absorbed NOx when the air-fuel ratio of exhaust gas flowing thereinto becomes rich. Then, it reduces and purifies the released NOx by hydrocarbons (HC) in exhaust gas.

The above-mentioned adsorption reduction type NOx catalyst is mainly used in most of the engine operating ranges, in order to purify the NOx in exhaust gas emitted from the internal combustion engine in which a combustion is executed at a lean air-fuel ratio. When a combustion is executed at a lean air-fuel ratio in most of the engine operating ranges, the air-fuel ratio of exhaust gas flowing into the NOx catalyst is also lean. Therefore, the NOx catalyst continues absorbing NOx for the duration of time that the air-fuel ratio of the inflow exhaust gas is lean.

Meanwhile, there is a limit to the amount of NOx that can be absorbed in the NOx catalyst. Once the amount of NOx absorbed by the NOx catalyst reaches the limit value, the NOx catalyst can no longer absorb NOx. Therefore, after that, NOx, which has flowed into the NOx catalyst, is not absorbed in the NOx catalyst and flows out of the NOx catalyst, which results in deterioration of exhaust emission as a whole.

In order to suppress deterioration of exhaust emission due to such a reason, it is necessary to detect that the total amount of NOx absorbed in the NOx catalyst (hereinafter referred to as a total NOx absorption amount) has reached the limit value, or that the total NOx absorption amount has come close to the limit value. Then, before NOx flows out of the NOx catalyst downstream, it is required to supply the NOx catalyst with exhaust gas with a rich air-fuel ratio, release NOx from the NOx catalyst, and reduce and purify the released NOx.

Accordingly, Japanese Patent Laid-Open Publication No.7-166851 discloses a NOx sensor for detecting a NOx concentration in exhaust gas flowing out of the NOx catalyst, is provided downstream of the NOx catalyst. This is in order to supply the NOx catalyst with exhaust gas with a rich air-fuel ratio, when the NOx concentration in exhaust gas flowing out of the NOx catalyst exceeds a predetermined concentration. More specifically, when the total amount of NOx absorbed in the NOx catalyst (total NOx absorption amount) has come close to the limit value, the ratio of NOx absorbed in the NOx catalyst among the NOx in exhaust gas drops, which causes the NOx concentration in exhaust gas flowing out of the NOx catalyst to increase gradually.

In the above-mentioned publication, it is determined on the basis of such a phenomenon that the total NOx absorption amount is close to the limit value when the NOx concentration in exhaust gas flowing out of the NOx catalyst exceeds the predetermined concentration. Then, exhaust gas with a rich air-fuel ratio are supplied to the NOx catalyst, NOx is released from the NOx catalyst, and the released NOx is reduced and purified by HC in exhaust gas, which suppresses deterioration of exhaust emission as a whole.

Meanwhile, a NOx concentration in exhaust gas flowing out of the NOx catalyst sometimes increases instantaneously depending on exhaust gas flow rate, etc. In the above-mentioned publication, the timing for supplying the NOx catalyst with exhaust gas with a rich air-fuel ratio is determined based on a NOx concentration. The NOx concentration is calculated only based on data obtained from the NOx sensor. Namely, the NOx concentration calculated in the above-mentioned publication is the NOx concentration in exhaust gas at a certain instant. Therefore, it is determined that the total NOx absorption amount is close to the limit value even when the NOx concentration in exhaust gas flowing out of the NOx catalyst has instantaneously increased. This means that exhaust gas with a rich air-fuel ratio are supplied to the NOx catalyst excessive number of times, which results in poor fuel economy as a whole.

SUMMARY OF THE INVENTION

Therefore, it is an object of the invention to estimate a total NOx amount absorbed in the NOx catalyst based on a NOx concentration in exhaust gas flowing out of the NOx catalyst more precisely.

In order to achieve the object, an exhaust emission control apparatus of the internal combustion engine according to an aspect of the invention includes, a NOx catalyst which absorbs NOx in exhaust gas when an air-fuel ratio of exhaust gas emitted from the internal combustion engine is lean, and also releases the absorbed NOx to reduce and purify the released NOx by hydrocarbon in the exhaust gas when an air-fuel ratio of exhaust gas is rich; a NOx sensor which detects a NOx concentration in exhaust gas flowing out of the NOx catalyst; a control portion which calculates a total NOx amount flowing out of the NOx catalyst while the vehicle runs for a predetermined distance based on a NOx concentration detected by the NOx sensor, calculates a NOx outflow amount per unit running distance based on the total NOx outflow amount, and supplies the NOx catalyst with exhaust gas with a rich air-fuel ratio when a NOx outflow amount per unit running distance exceeds a predetermined amount. Namely, according to this, a total NOx amount absorbed in the NOx catalyst is estimated based on an average NOx outflow amount obtained while the vehicle runs for a predetermined distance.

Also, a total NOx amount absorbed in the NOx catalyst can be estimated, in a similar manner, based on a total NOx outflow amount per unit time of the internal combustion engine or per unit engine speed.

DETAILED DESCRIPTION OF THE PREFERRED EMBODIMENTS

Figure 1:
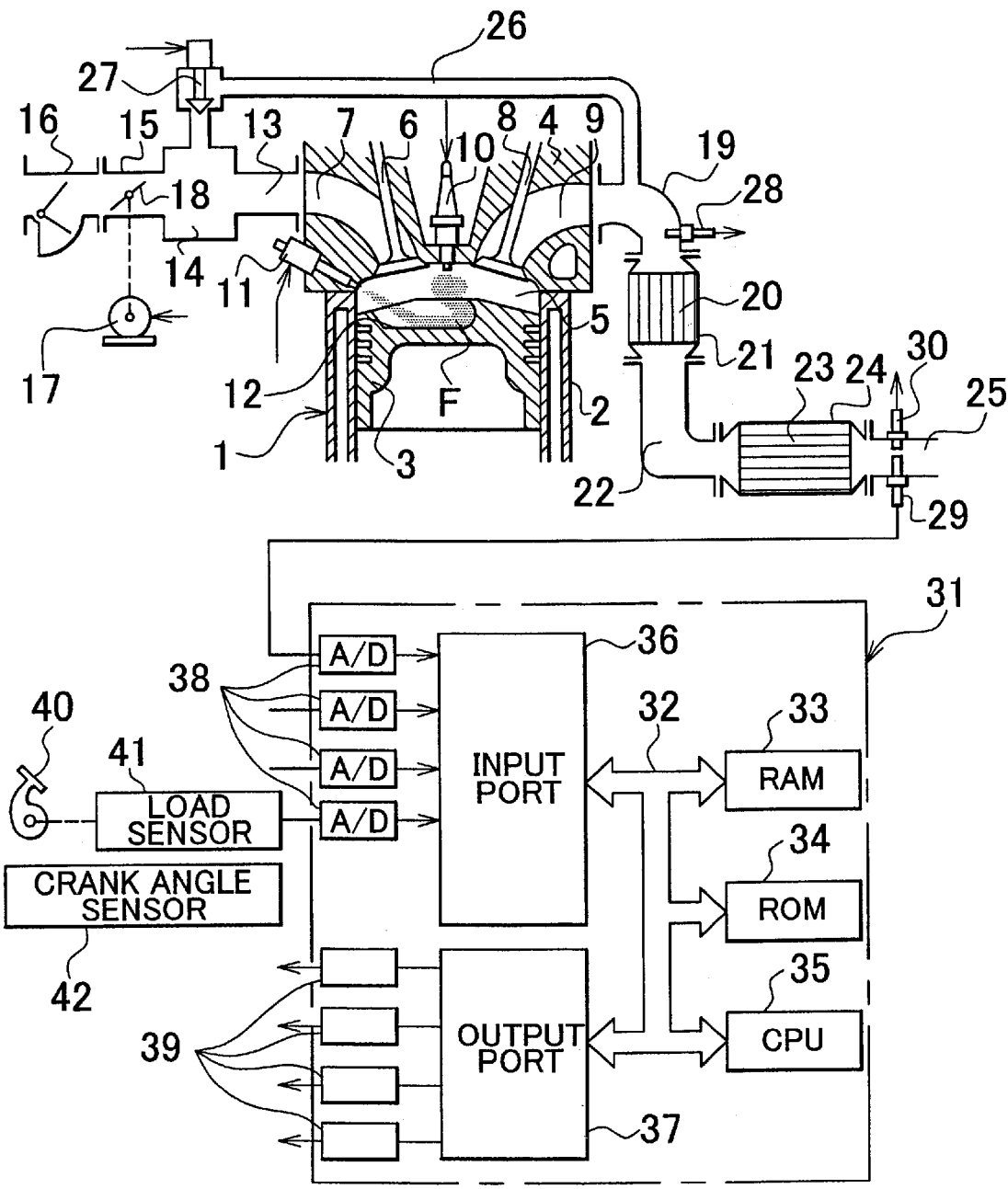
FIG. 1 is a view indicating an internal combustion engine provided with an exhaust emission control apparatus according to the invention.

Hereinafter, embodiments of the invention will be explained. FIG. 1 shows a case where the invention is applied to an air-cylinder injection type spark ignition engine. The invention, however, can also be applied to a compression ignition type internal combustion engine. An engine 1, a cylinder block 2, a piston 3 which reciprocates within the cylinder block 2, a cylinder head 4 fixed on the cylinder block 2, a combustion chamber 5 formed between the piston 3 and the cylinder head 4, an intake valve 6, an intake port 7, an exhaust valve 8, an exhaust port 9 are respectively shown in FIG. 1. As shown in FIG. 1, a spark plug 10 is disposed in the center on the inner wall surface of the cylinder head 4, and a fuel injection valve 11 is disposed at the inner wall surface peripheral portion of the cylinder head 4. Also, a cavity 12, extending from below the fuel injection valve 11 to below the spark plug 10, is formed on a top face of the piston 3.

The intake port 7 of each cylinder is connected to a surge tank 14 through an each corresponding branch pipe 13. The surge tank 14 is coupled to an air cleaner (not shown) through an intake duct 15 and an air flow meter 16. A throttle valve 18 driven by a step motor 17 is disposed in the intake duct 15. Meanwhile, the exhaust port 9 of each cylinder is coupled to an exhaust manifold 19. The exhaust manifold 19 is coupled to a casing 24 with the built-in NOx catalyst 23, through a catalytic converter 21 with a built-in oxidation catalyst or a three-way catalyst 20, and an exhaust pipe 22. The exhaust manifold 19 and the surge tank 14 are coupled to each other through a recirculating exhaust gas (hereinafter referred to as EGR gas) duct 26, and an EGR gas control valve 27 is disposed in the EGR gas duct 26.

An electronic control portion 31, as a control portion, includes a digital computer, and is provided with a RAM (random access memory) 33, a ROM (read only memory) 34, a CPU (microprocessor) 35, an input port 36, and an output port 37 interconnected through bi-directional buses 32. The air flow meter 16 generates an output voltage proportional to an intake air amount, and the output voltage is input into an input port 36 through a corresponding A/D converter 38. An air-fuel ratio sensor 28 for detecting an air-fuel ratio is mounted on the exhaust manifold 19, and an output signal of the air-fuel ratio sensor 28 is input into the input port 36 through the corresponding A/D converter 38. Also, a NOx ammonia sensor 29, as a NOx sensor, capable of detecting both NOx concentration and ammonia concentration in exhaust gas, and an air-fuel ratio sensor 30 are disposed in an exhaust pipe 25, which is connected to an outlet of the casing 24 with the built-in NOx catalyst 23. The output signals of the NOx ammonia sensor 29 and the air-fuel ratio sensor 30 are input into the input port 36 through each corresponding A/D converter 38.

Also, a load sensor 41, which generates an output voltage proportional to pedal depression amount of an accelerator pedal 40, is connected to the accelerator pedal 40. An output voltage of the load sensor 41 is input into the input port 36 through the corresponding A/D converter 38. A crank angle sensor 42 generates an output pulse, for example, each time a crankshaft rotates 30 degrees. The output pulse is input into the input port 36. A rotation frequency of the engine is calculated by a CPU 35 based on the output pulse of the crank angle sensor 42. Meanwhile, an output port 37 is connected to the spark plug 10, the fuel injection valve 11, the step motor 17, and the EGR control valve 27 through a corresponding drive circuit 39.

Figure 2:
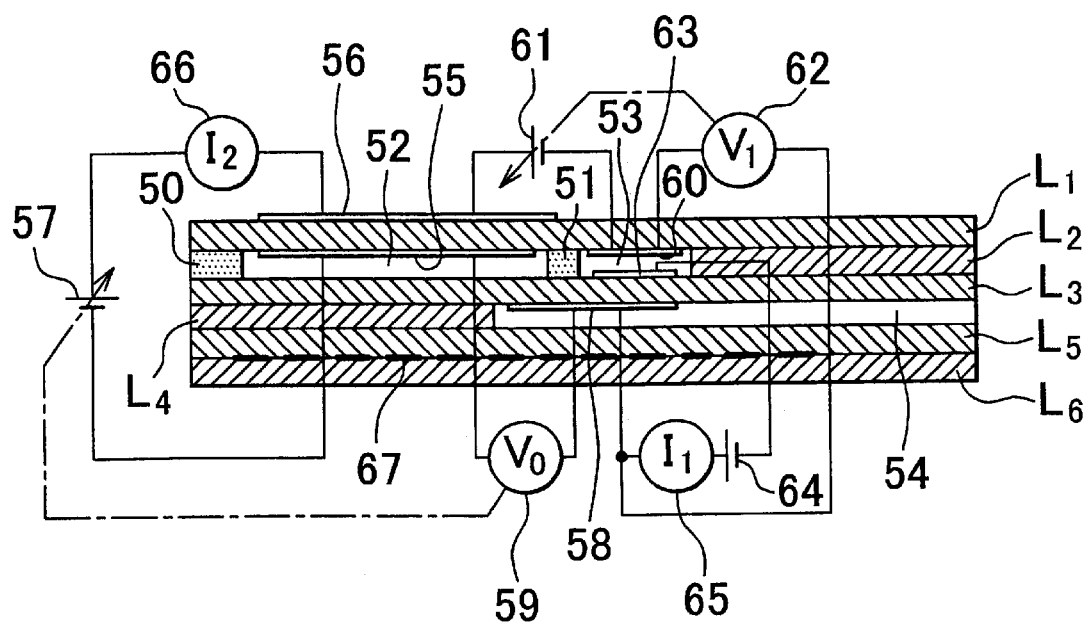
FIG. 2 is an explanatory view of a structure of a NOx ammonia sensor.

Hereinafter, a structure of a sensor portion of the NOx ammonia sensor 29 shown in FIG. 1 will be briefly explained with reference to FIG. 2. Referring to FIG. 2, the sensor portion of the NOx ammonia sensor 29 is composed of interlaminated six oxygen ion-conductive solid electrolyte layers including zirconia oxide. The six solid electrolyte layers are called a first layer $L_1$, a second layer $L_2$, a third layer $L_3$, a fourth layer $L_4$, a fifth layer $L_5$, and a sixth layer $L_6$, starting from the top layer.

Referring to FIG. 2, a first diffusing rate-determining member 50 and a second diffusing rate-determining member 51, for example, which are porous or on which pores have been formed, are disposed between the first layer $L_1$ and the third layer $L_3$. A first chamber 52 is formed between the diffusing rate-determining members 50 and 51. A second chamber 53 is formed between the second diffusion chamber 51 and the second layer $L_2$. Also, an air chamber 54, which is communicating with outdoor air, is formed between the third layer $L_3$ and the fifth layer $L_5$. Meanwhile, an outer end surface of the first diffusing rate-determining member 50 is in contact with exhaust gas. Therefore, exhaust gas flow into the first chamber 52 through the first diffusing rate-determining member 50, and thus the first chamber 52 is filled with exhaust gas in this manner.

Meanwhile, a cathode side first pump electrode 55 is formed on an inside perimeter surface of the first layer $L_1$ facing the first chamber 52. An anode side first pump electrode 56 is formed on an outer perimeter surface of the first layer $L_1$. A voltage is applied between the cathode side first pump electrode 55 and the anode side first pump electrode 56 by a first pump voltage source 57. Applying a voltage between the first pump electrodes 55 and 56 causes oxygen contained in exhaust gas in the first chamber 52 to become oxygen ion by contacting the cathode side first pump electrode 55. The oxygen ion flows toward the anode side first pump electrode 56 in the first layer $L_1$. Therefore, oxygen contained in exhaust gas in the first chamber 52 moves in the first layer $L_1$, and is drawn outside. The amount of oxygen drawn outside increases with rises in voltage of the first pump voltage source 57.

Meanwhile, a reference electrode 58 is formed on an inside perimeter surface of the third layer $L_3$ facing the air chamber 54. If an oxygen concentration of one side of the solid electrolyte layer differs from that of the other side in the oxygen ion-conductive solid electrolyte, oxygen ion moves toward one side with a lower oxygen concentration from the other side with a higher oxygen concentration in the solid electrolyte layer. In an example shown in FIG. 2, as an oxygen concentration in the air chamber 54 is higher than that in the first chamber 52, oxygen in the air chamber 54 receives an electric charge and becomes oxygen ion by contacting the reference electrode 58. The oxygen ion moves in the third layer $L_3$, the second layer $L_2$ and the first layer $L_1$, and releases the electric charge at the cathode side first pump electrode 55. As a result, a voltage $V_0$ in part 59 is generated between the reference electrode 58 and the cathode side first pump electrode 55. The voltage $V_0$ is proportional to the difference of oxygen concentrations between the air chamber 54 and the first chamber 52.

According to the example shown in FIG. 2, a voltage of the first pump voltage source 57 is feedback-controlled so that the voltage $V_0$ agrees with a voltage which is generated when an oxygen concentration in the first chamber 52 is 1 p.p.m. Namely, oxygen in the first chamber 52 is drawn through the first layer $L_1$ so that an oxygen concentration in the first chamber 52 becomes equal to 1 p.p.m, which maintains oxygen concentration in the first chamber 52 at 1 p.p.m.

It should be noted that since the cathode side first pump electrode 55 is formed out of materials with a low reducing capability on NOx, such as an alloy of gold Au and platinum Pt, little NOx contained in exhaust gas is reduced in the first chamber 52. Therefore, the NOx flows into the second chamber 52 through the second diffusing rate-determining member 51.

Meanwhile, a cathode side second pump electrode 60 is formed on the inside perimeter surface of the first layer $L_1$ facing the second chamber 53, and a voltage is applied between the cathode side second pump electrode 60 and the anode side first pump electrode 56 by a second pump voltage source 61. Applying a voltage between the pump electrodes 60 and 56 allows oxygen contained in exhaust gas in the second chamber 53 to become oxygen ion by contacting the cathode side second pump electrode 60. The oxygen ion flows toward the anode side first pump electrode 56 in the first layer $L_1$ so that oxygen contained in exhaust gas in the second chamber 53 moves in the first layer $L_1$ to be drawn outside. The amount of oxygen drawn outside increases with rises in voltage of the second pump voltage source 61.

Meanwhile, as mentioned above, if there is a difference of oxygen concentrations between each side of the solid electrolyte layer in the oxygen ion-conductive solid electrolyte, oxygen ion moves toward one side with a lower oxygen concentration from the other side with a higher oxygen concentration in the solid electrolyte layer. In an example shown in FIG. 2, as an oxygen concentration in the air chamber 54 is higher than that in the second chamber 53, oxygen in the air chamber 54 receives an electric charge and becomes oxygen ion by contacting the reference electrode 58. The oxygen ion moves in the third layer $L_3$, the second layer $L_2$ and the first layer $L_1$, and releases the electric charge at the cathode side second pump electrode 60. As a result, a voltage $V_1$ is generated between the reference electrode 58 and the cathode side second pump electrode 60. The voltage $V_1$ is proportional to a difference of oxygen concentrations between the air chamber 54 and the second chamber 53.

In the example shown in FIG. 2, a voltage of the second pump voltage source 61 is feedback-controlled so that the voltage $V_1$ agrees with a voltage which is generated when an oxygen concentration in the second chamber 53 is equal to 0.01 p.p.m. Namely, oxygen in the second chamber 53 is drawn through the first layer $L_1$ so that the oxygen concentration in the second chamber 53 becomes equal to 0.01 p.p.m, which maintains an oxygen concentration in the first chamber 52 at 0.01 p.p.m.

It should be noted that the cathode side second pump electrode 60 is formed out of materials with a low reducing capability on NOx, such as an alloy of gold Au and platinum Pt. Therefore, little NOx contained in exhaust gas is reduced even after a contact with the cathode side second pump electrode 60.

Meanwhile, a cathode side second pump electrode 63 for detecting NOx is formed on the inside perimeter surface of the third layer $L_3$ facing the second chamber 53. The cathode side pump electrode 63 is formed out of materials with a high reducing capability on NOx, such as rhodium Rh and platinum Pt. Therefore, NOx in the second chamber 53, practically, NO which constitutes a major portion, is decomposed into $N_2$ and $O_2$. As shown in FIG. 2, a predetermined voltage 64 is applied between the cathode side pump electrode 63 and the reference electrode 58. Therefore, the thus generated $O_2$ after decomposition on the cathode side pump electrode 63 becomes oxygen ion, and moves toward the reference electrode 58 in the third layer $L_3$. A current $I_1$ proportional to the amount of oxygen ion is passed between the cathode side pump electrode 63 and the reference electrode 58.

As mentioned above, little NOx is reduced in the first chamber 52, and there exists little oxygen in the second chamber 53. Therefore, the current $I_1$ becomes proportional to a NOx concentration contained in exhaust gas, and it becomes possible to detect the NOx concentration in exhaust gas based on the current $I_1$ in this manner.

Meanwhile, ammonia $NH_3$ contained in exhaust gas is decomposed into NO and $H_2O$ in the first chamber 52 ($4NH_3+5O_2 \rightarrow 4NO+6H_2O$), and the decomposed NO flows into the second chamber 53 through the second diffusing rate-determining member 51. The NO is decomposed into $N_2$ and $O_2$ on the cathode side pump electrode 63, and the decomposed $O_2$ becomes oxygen ion and moves toward the reference electrode 58 in the third layer $L_3$. The current $I_1$ also becomes proportional to a $NH_3$ concentration contained in exhaust gas, and it becomes possible to detect the $NH_3$ concentration in exhaust gas based on the current $I_1$ in this manner.

Figure 3:
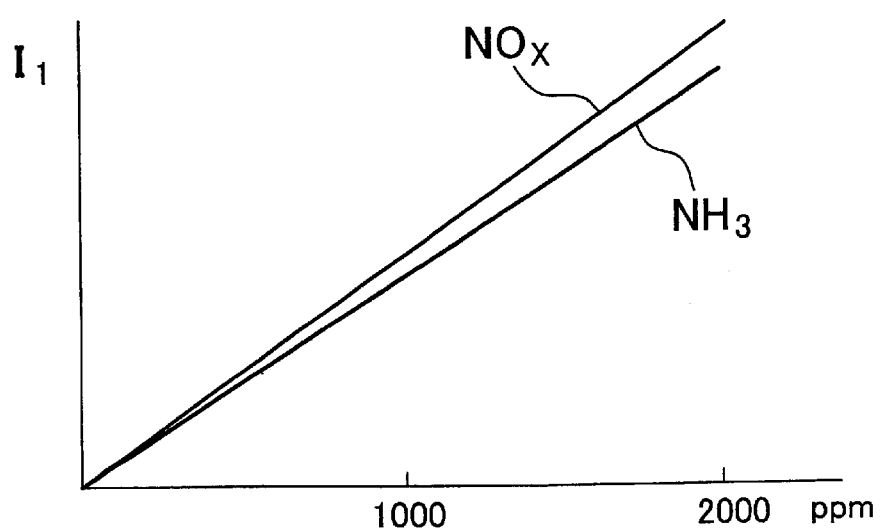
FIG. 3 is a graph showing a relation between NOx and ammonia concentrations, and an output of the NOx ammonia sensor.

FIG. 3 shows a relation of the current $I_1$, with the NOx concentration and the $NH_3$ concentration in exhaust gas. As can be understood from FIG. 3, the current $I_1$ is proportional to the NOx concentration and the $NH_3$ concentration in exhaust gas.

Meanwhile, the higher an oxygen concentration in exhaust gas is, in other words, the leaner an air-fuel ratio is, the larger the amount of oxygen drawn outside from the first chamber 52 becomes, which increases the amount of a current $I_2$ in part 66. Therefore, an air-fuel ratio of exhaust gas can be detected based on the current $I_2$.

It should be noted that an electric heater 67 for heating the sensor portion of the NOx ammonia sensor 29 is provided between the fifth layer $L_5$ and the sixth layer $L_6$. The sensor portion of the NOx ammonia sensor 29 is heated up to 700 to 800 degrees Celsius by the electric heater 67.

Figure 4:
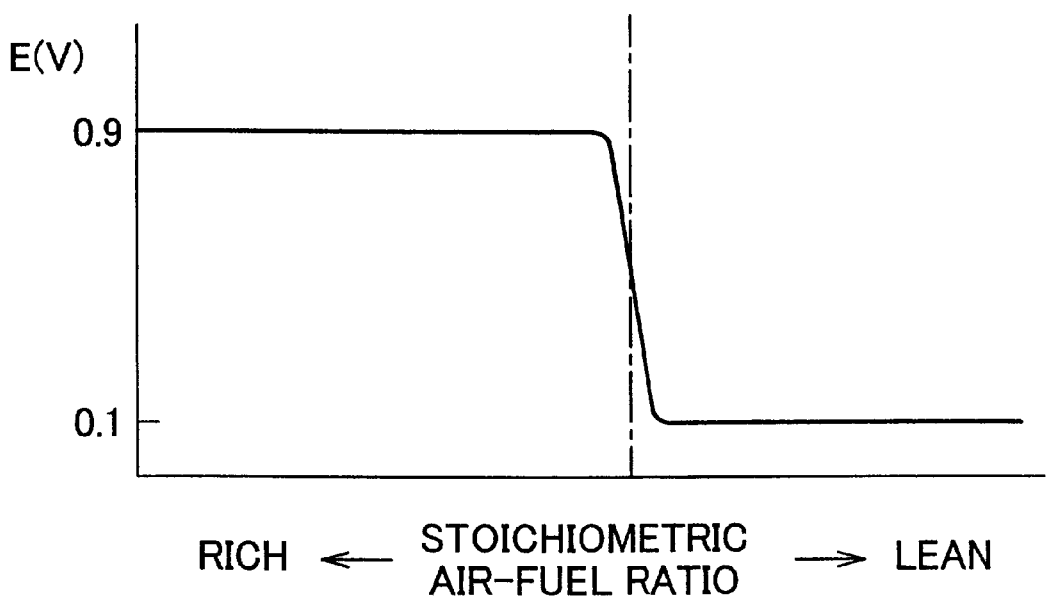
FIG. 4 is a graph showing a relation between an air-fuel ratio and an output of an air-fuel ratio sensor.

FIG. 4 shows an output voltage E (V) of the air-fuel ratio sensor 30 provided in the exhaust pipe 25 downstream of the NOx absorbent 23, that is, an output signal level of means for detecting an air-fuel ratio. As can be understood from FIG. 4, the air-fuel ratio sensor 30 generates an output voltage of the order of 0.9 (V) when an air-fuel ratio of exhaust gas is rich, and an output voltage of the order of 0.1

(V) when an air-fuel ratio of exhaust gas is lean. Referring to FIG. 4, an output signal level showing that an air-fuel ratio is rich is 0.9 (V), and an output signal level showing that an air-fuel ratio is lean is 0.1 (V).

Meanwhile, as mentioned above, an air-fuel ratio of exhaust gas can be detected based on the current $I_2$ of the NOx ammonia sensor 29, and accordingly, the NOx ammonia sensor 29 can be used as means of detecting an air-fuel ratio. In this case, it is not required to provide the air-fuel ratio sensor 30.

Hereafter, fuel injection control of the internal combustion engine shown in FIG. 1 will be explained referring to FIG. 5 A. A vertical axis shows an engine load Q/N (intake air amount Q/engine speed N), and a horizontal axis shows an engine speed N in FIG. 5A.

Figure 5A:
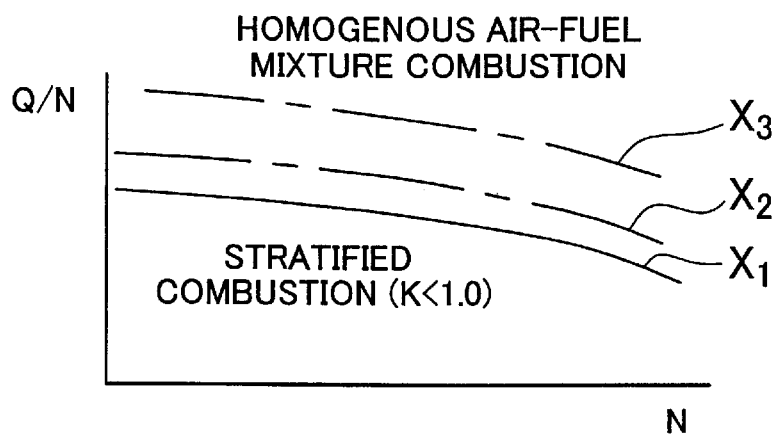
FIG. 5 is an explanatory view of fuel injection control of the internal combustion engine.

In FIG. 5A, a stratified combustion is executed in an operating area on a low load side of a solid line $X_1$. This means that a fuel F is then injected toward the inside of the cavity 12 from the fuel injection valve 11 at the final stage of compression stroke, as shown in FIG. 1. The fuel moves along an inside perimeter surface of the cavity 12 to be transformed to an air-fuel mixture in the vicinity of the spark plug 10. Then, the air-fuel mixture is ignited and combusted by the spark plug 10. An average air-fuel ratio in the combustion chamber 5 is lean at this time.

Meanwhile, in an operating area on a higher load side with respect to the solid line $X_1$ in FIG. 5A, a fuel is injected from the fuel injection valve 11 during an intake stroke, and a homogenous air-fuel mixture combustion is then executed. A homogenous air-fuel mixture combustion is executed at a lean air-fuel ratio in an operating area between the solid line $X_1$ and a chain line $X_2$. A homogenous air-fuel mixture combustion is executed at the stoichiometric air-fuel ratio between the chain line $X_2$ and a chain line $X_3$. The homogenous air-fuel mixture combustion is executed at a rich air-fuel ratio in an operating area on higher load side with respect to the chain line $X_3$.

Figure 5B:
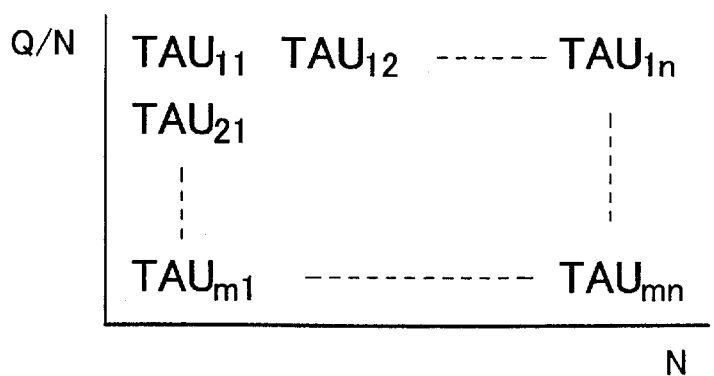
Figure 5C:
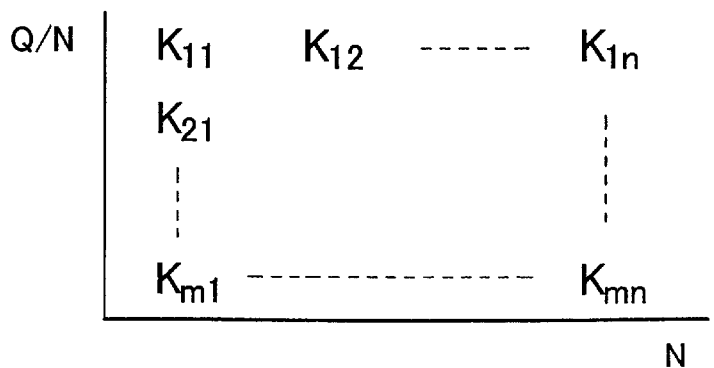

In the invention, a basic fuel injection amount TAU required to make an air-fuel ratio equal to the stoichiometric air-fuel ratio is pre-stored in the ROM 34 in map format, as a function of the engine load Q/N and the engine speed N, as shown in FIG. 5B. Basically, a final fuel injection amount TAUO (=K·TAU) is calculated by multiplying the basic fuel injection amount TAU by a correction factor K. The correction factor K is pre-stored in the ROM 34 in map format, as the function of the engine load Q/N and the engine speed N, as shown in FIG. 5C.

The correction factor K is less than 1.0 in an operating area on a lower load side with respect to the chain line $X_2$ in FIG. 5A, where a combustion is executed at a lean air-fuel ratio, and is more than 1.0 in an operating area on a higher load side with respect to the chain line $X_3$ in FIG. 5A, where a combustion is executed at a rich air-fuel ratio. Also, the correction factor K is 1.0 between the chain line $X_2$ and the chain line $X_3$. The air-fuel ratio is then feedback-controlled based on an output signal of the air-fuel ratio sensor 28 so that the air fuel ratio becomes equal to the stoichiometric air-fuel ratio.

The NOx catalyst 23 disposed in an engine exhaust passage is provided with the NOx absorbent having an alimina, or the like, as a carrier, etc. On the carrier, at lease one selected from alkali metal such as kalium K, sodium Na, lithium Li, and caesium Cs; alkaline earth such as barium Ba and calcium Ca; or rare earth such as lanthanum La and yttrium Y, as well as a precious metal such as platinum Pt, are supported. In this case, it is also possible to provide a particulate filter made out of a cordierite, etc. in the casing 24, and support the NOx absorbent for which the carrier is alumina on the particulate filter.

In any of these cases, if a ratio of an amount of air to an amount of fuel (carbon hydride) supplied into an engine intake passage, a combustion chamber 5, and an exhaust passage upstream of the NOx catalyst 23 is equal to an air-fuel ratio of exhaust gas flowing into the NOx catalyst 23, the NOx catalyst 23 performs NOx absorption and release actions by absorbing NOx when an air-fuel ratio of inflow exhaust gas is lean, and releasing the absorbed NOx when an air-fuel ratio of inflow exhaust gas is equal to the stoichiometric air-fuel ratio or rich.

Although the NOx catalyst 23 actually performs absorption and release actions, if it is provided in the engine exhaust passage, some elements in a detailed mechanism of the absorption and release actions have yet to be clarified. However, it is considered that the absorption and release actions are performed according to a mechanism shown in FIG. 6. Thereinafter, the mechanism is explained taking a case, where platinum Pt and barium Ba are supported on a carrier, as an example. Also, in a case where another precious metal, alkali metal, alkaline earth, or rare earth is supported, the same mechanism is applied.

Figure 6A:
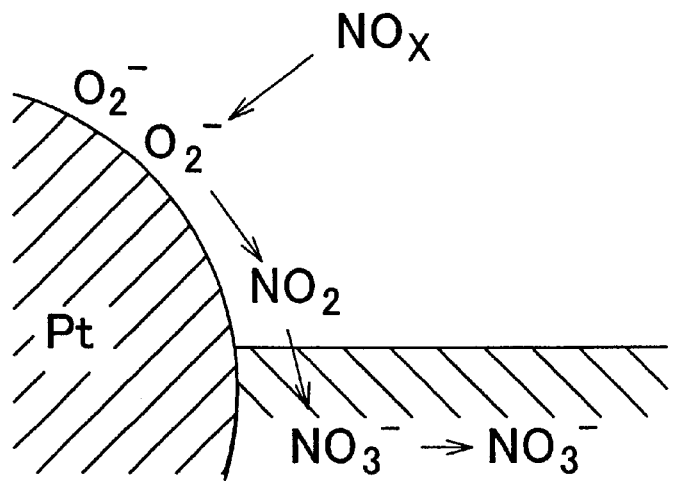
FIG. 6 is an explanatory view of NOx absorption and release actions of a NOx catalyst.
Figure 6B:
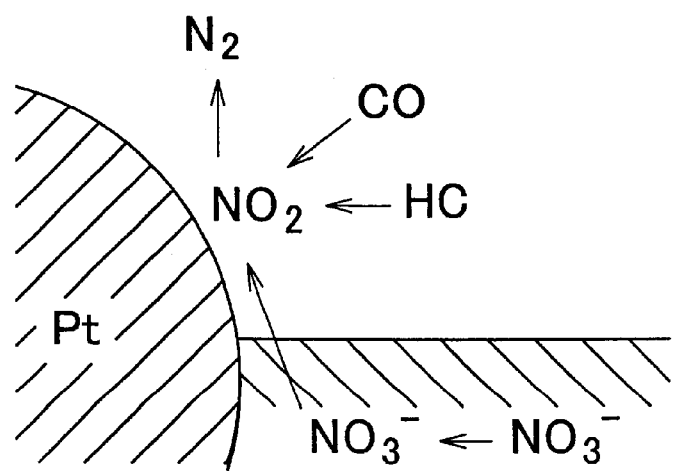

In the internal combustion engine shown in FIG. 1, a combustion is executed at a lean air-fuel ratio in most of the frequently-used operating states. Thus, when a combustion is executed in a condition where an air-fuel ratio is lean like this, an oxygen concentration in exhaust gas is high, and oxygen $O_2$ is adhered to a surface of platinum Pt, in the form of $O_2^-$ or $O^{2-}$ [31], as shown in FIG. 6A. Meanwhile, NO contained in inflow exhaust gas reacts with $O_2^-$ or $O^{2-}$ on the surface of platinum Pt to become $NO_2$ ($2NO + O_2 \rightarrow 2NO_2$). Subsequently, a part of the generated $NO_2$ is absorbed into the absorbent while being oxidized on platinum Pt, and is diffused in the absorbent in the form of nitrate ion $NO_3^-$, as shown in FIG. 6A, while being combined with barium oxide BaO. Thus, NOx is absorbed into the NOx absorbent. As long as an oxygen concentration in inflow exhaust gas is high, $NO_2$ is generated on the surface of platinum Pt, and as long as the NOx absorption capacity of absorbent has not been saturated, $NO_2$ is absorbed into the absorbent to generate nitrate ion $NO_3^-$ Meanwhile, when an air-fuel ratio of inflow exhaust gas becomes rich, an oxygen concentration in inflow exhaust gas declines, which reduces an amount of $NO_2$ generation on the surface of platinum Pt. When an amount of $NO_2$ generation is reduced, a reaction develops in a reverse direction ($NO_3^- \rightarrow NO_2$), and nitrate ion $NO_3^-$ in the absorbent is released in the form of $NO_2$ in this manner. NOx released from NOx absorbent 23 is reacted with a large amount of unburned HC and CO, contained in inflow exhaust gas, to be reduced. Once $NO_2$ becomes nonexistent on the surface of platinum Pt, $NO_2$ is released from the absorbent one after another. Therefore, when an air-fuel ratio of inflow exhaust gas becomes rich, NOx is released from the NOx absorbent within a short time. Furthermore, since the released NOx is reduced, NOx is never emitted into the air.

In this case, NOx is released from the NOx absorbent even an air-fuel ratio of inflow exhaust gas is made to be equal to a stoichiometric air-fuel ratio. However, when the air-fuel ratio of inflow exhaust gas is made to be equal to the stoichiometric air-fuel ratio, NOx is released from the NOx absorbent only gradually. Due to such a reason, it takes a slightly long time to allow the NOx absorbed in the NOx absorbent to be released entirely.

The NOx catalyst 23 has a limited NOx absorption capacity, that is, there is a limit for an amount of NOx that the NOx catalyst 23 can absorb in total. Therefore, it is required to allow NOx to be released from the NOx catalyst 23 before the NOx absorption capacity of the NOx catalyst 23 becomes saturated. This means that the NOx catalyst 23 absorbs almost all the NOx contained in exhaust gas as long as the NOx absorption capacity is adequate. However, once the NOx absorption capacity comes close to a limit value, the NOx catalyst 23 becomes unable to absorb some NOx, and the amount of NOx flowing downstream out of the NOx catalyst 23 begins increasing in this manner.

Then, once the amount of NOx absorbed in the NOx catalyst 23 in total (hereinafter referred to as a total NOx absorption amount) reaches the limit value (hereinafter referred to as a NOx absorption limit value), the NOx catalyst 23 can no longer absorb NOx. Therefore, NOx flowing into the NOx catalyst 23 is not absorbed in the NOx catalyst 23 and flows downstream out of the NOx catalyst 23, which results in deterioration of exhaust emission as a whole.

Therefore, in the embodiment, it is determined whether to supply the NOx catalyst 23 with exhaust gas with a rich air-fuel ratio to process the NOx absorbed in the NOx catalyst 23, that is, whether the total NOx absorption amount reaches the NOx absorption limit value. When it is determined that NOx should be processed, exhaust gas with a rich air-fuel ratio are supplied to the NOx catalyst 23. According to this, NOx is released from the NOx catalyst 23, and the released NOx is reduced and purified by HC in exhaust gas. Therefore, the NOx catalyst 23 becomes able to absorb NOx when exhaust gas with a lean air-fuel ratio flow into the NOx catalyst 23 after that. According to the embodiment, deterioration of exhaust emission is suppressed in this manner.

According to the embodiment, in order to determine whether to process the NOx absorbed in the NOx catalyst 23, whether the total NOx absorption amount reaches the NOx absorption limit value is determined, as mentioned above. Therefore, in order to minimize the number of times to supply the NOx catalyst with exhaust gas with a rich air-fuel ratio as well as to allow the total NOx absorption amount not to exceed the NOx absorption limit value, it is extremely important to ascertain that the total NOx absorption amount has come close to the NOx absorption limit value.

It is also possible to ascertain that the total NOx absorption amount has come close to the NOx absorption limit value based on an output of the NOx ammonia sensor 29. Namely, because the output of the NOx ammonia sensor 29 gradually increases as the total NOx absorption amount comes close to the NOx absorption limit value, it is also possible to determine that the total NOx absorption amount has come close to the NOx absorption limit value by ascertaining that the output of the NOx ammonia sensor has exceeded a predetermined value.

However, a NOx concentration detected by the NOx ammonia sensor 29 is the NOx concentration at a certain instant. Therefore, for example, when the NOx concentration in exhaust gas flowing out of the NOx catalyst 23 instantaneously increases, the NOx ammonia sensor 29 detects the instantaneously increased concentration. Even the detected NOx concentration at this time is higher than the predetermined value, this sometimes does not show that the total NOx absorption amount has come close to the NOx absorption limit value. Namely, it is impossible to determine only based on the output of the NOx ammonia sensor 29 that the total NOx absorption amount has come close to the NOx absorption limit value.

Thus, in order to determine more precisely that the total NOx absorption amount has come close to the NOx absorption limit value, in the embodiment, it is determined that the total NOx absorption amount has come close to the NOx absorption limit value based on an average value of the total NOx amount flowing out of the NOx catalyst while a vehicle, on which the internal combustion engine and the exhaust emission control apparatus are mounted, runs for a predetermined distance. Namely, referring to a distance that the vehicle runs as a vehicle running distance, and an amount of NOx flowing out of the NOx catalyst as a NOx outflow amount, in the embodiment, the total NOx outflow amount is calculated using the output of the NOx ammonia sensor 29, while the vehicle runs for the predetermined distance. The NOx outflow amount per a unit vehicle running distance is calculated by dividing the total NOx outflow amount by the above-mentioned predetermined distance. It is determined that the total NOx absorption amount has come close to the NOx absorption limit value by ascertaining that the NOx outflow amount per the unit vehicle running distance has exceeded the predetermined value.

According to this, even the NOx concentration in exhaust gas flowing out of the NOx catalyst 23 instantaneously increases, it cannot be determined that the total NOx absorption amount has come close to the NOx absorption limit value. As a result, it is possible to determine precisely that the total NOx absorption amount has come close to the NOx absorption limit value, according to the embodiment.

It should be noted that, in the embodiment, when a vehicle is not moving although the internal combustion engine is being operated, that is, the internal combustion engine is being idle-operated, the vehicle running distance is calculated assuming that the vehicle is moving for a predetermined distance, while the internal combustion engine is being idle-operated although the vehicle is not moving.

Also, in the second embodiment of the invention, in order to determine more precisely that the total NOx absorption amount has come close to the NOx absorption limit value, it is determined that the total NOx absorption amount has come close to the NOx absorption limit value based on the average value of the total NOx amount flowing out of the NOx catalyst until a predetermined time period has lapsed. Namely, in the embodiment, a NOx outflow amount per unit of time by calculating the total NOx outflow amount using the output of the NOx ammonia sensor 29 for a predetermined time period, and then dividing the total NOx outflow amount by the above-mentioned predetermined time period. It is determined that the total NOx absorption amount is close to the NOx absorption limit value by ascertaining the NOx outflow amount per unit of time has exceeded the predetermined amount.

According to this, as well as the first embodiment, even the NOx concentration in exhaust gas flowing out of the NOx catalyst 23 instantaneously increases, it is not determined that the total NOx absorption amount has come close to the NOx absorption limit value. As a result, it is possible to determine precisely that the total NOx absorption amount has come close to the NOx absorption limit value, according to the embodiment.

The total NOx outflow amount is calculated according to the following formula in the above-mentioned embodiment.

$$Anoxsum = Smask \times Qinj \times SV \times K$$

where, Anoxsum is a total NOx outflow amount obtained while the vehicle runs for a predetermined distance, and, in the second embodiment, Anoxsum is a total NOx outflow amount obtained until a predetermined time period has lapsed.

Also, Smask is a value found by integrating values obtained by mask processing the output of the NOx ammonia sensor 29, while the vehicle runs for the predetermined distance in the first embodiment, and until a predetermined time period has lapsed in the second embodiment. Namely, it is required to remove effects of ammonia from the output of the NOx ammonia sensor 29, in order to allow the NOx ammonia sensor 29 to precisely detect the NOx concentration in exhaust gas flowing out of the NOx catalyst 23, as the NOx ammonia sensor 29 sometimes detects an ammonia concentration in exhaust gas as well. Therefore, the value obtained by mask processing the output of the ammonia sensor 29 is used instead of using the output of the ammonia sensor 29 without processing, in the embodiment. It should be noted that the mask processing can be executed using either software installed in the control portion 31 or a low-pass filter including hardware.

Qinj, in the first embodiment, is an amount of fuel injected into the combustion chamber while the vehicle runs for a predetermined distance. Also, Qinj, in the second embodiment, is an amount of fuel injected into the combustion chamber until a predetermined time period has lapsed. SV, in the first embodiment, is an amount of exhaust gas flowing into the NOx catalyst 23 while the vehicle runs for a predetermined distance. Also, SV, in the second embodiment, is an amount of exhaust gas flowing into the NOx catalyst 23 until a predetermined time period has lapsed. When the total NOx outflow amount is calculated, K is a correction factor for taking account of effects on the total NOx outflow amount caused by factors, which could have effects on the total NOx outflow amount. The potential factors are other than the output of the NOx ammonia sensor 29, the amount of fuel injected into the combustion chamber, or the amount of exhaust gas flowing into the NOx catalyst 23.

Figure 7:
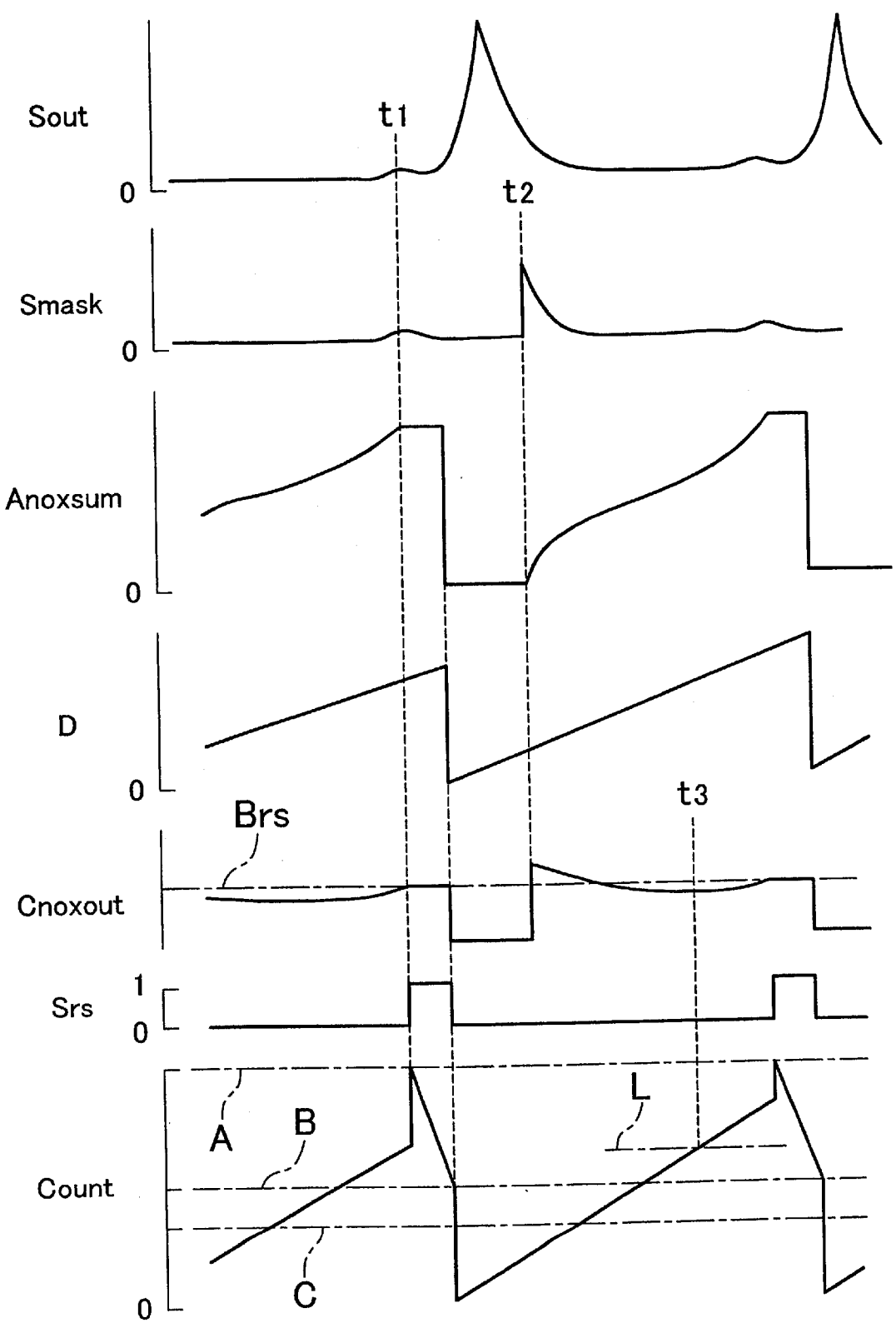
FIG. 7 is a time chart explaining rich spike control of the first embodiment.
Figure 8:
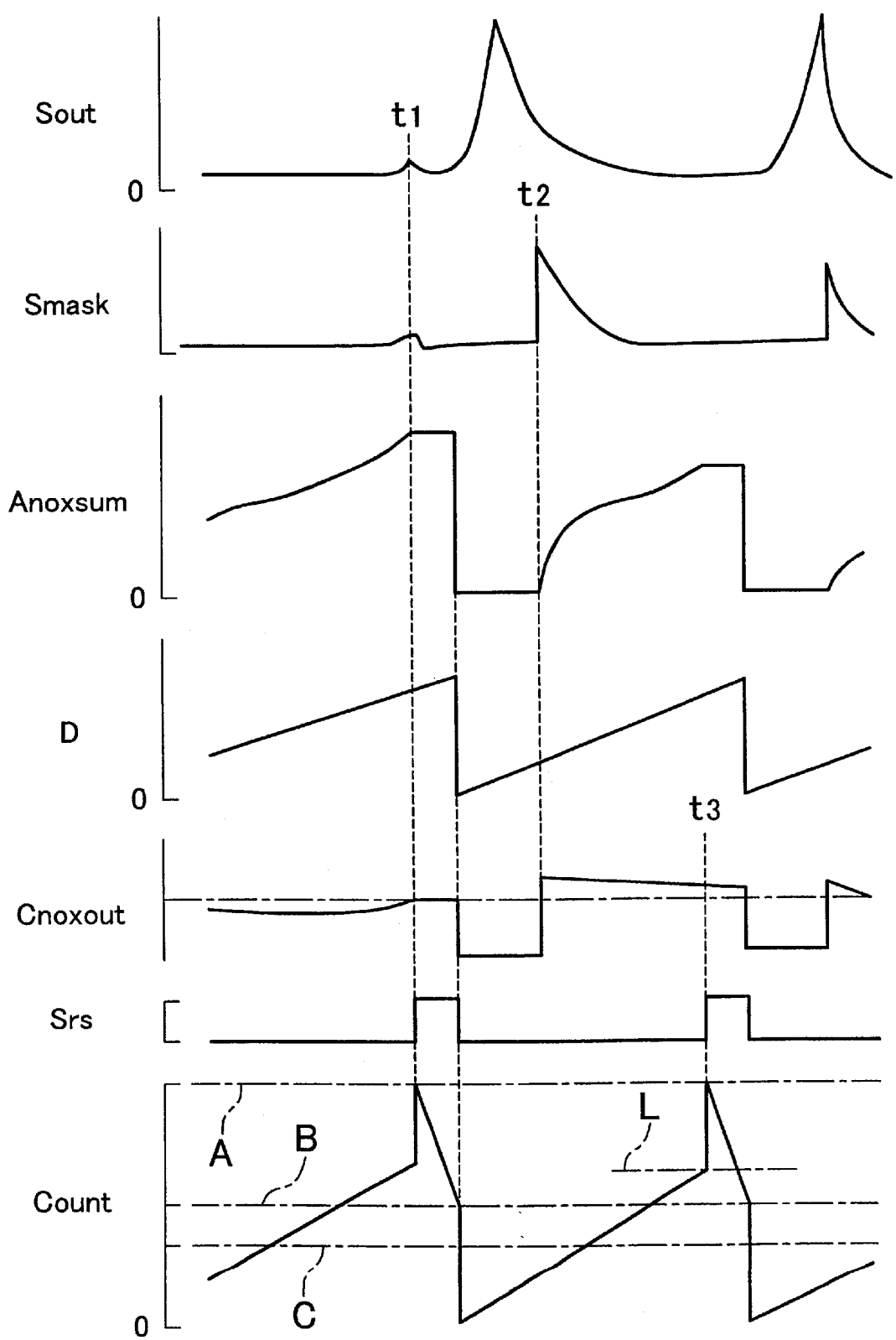
FIG. 8 is a time chart explaining rich spike control of the first embodiment.

Hereinafter, a detailed explanation will be given regarding a case where it is determined that the total NOx absorption amount has come close to the NOx absorption limit value, according to the first embodiment, referring to time charts shown in FIGS. 7 and 8. In FIGS. 7 and 8, Sout is an output of the NOx ammonia sensor 29, Smask is a masking output value calculated by mask processing Sout, Anoxsum is a total NOx outflow amount, D is a vehicle running distance, Cnoxout is an average NOx outflow amount calculated by dividing a total NOx outflow amount Anoxsum by the vehicle running distance D, Srs is a rich spike signal to be output in order to supply the NOx catalyst 23 with exhaust gas with a rich air-fuel ratio, and Count is a counter value showing the total NOx absorption amount calculated theoretically based on an operational state of the internal combustion engine.

Referring to FIG. 7, while a total amount of NOx actually absorbed in the NOx catalyst 23 is little, that is, prior to a time t1 in FIG. 7, the output of the NOx ammonia sensor 29 Sout is remarkably low. Therefore, a masking output value Smask is remarkably low as well. Also, during this time period, the total NOx outflow amount Anoxsum gradually increases. The vehicle running distance D gradually increases as well.

However, the average NOx outflow amount is smaller than a determination value Brs. In this case, the determination value Brs is a threshold value for determining whether exhaust gas with a rich air-fuel ratio should be supplied to the NOx catalyst 23. Therefore, as the average NOx outflow amount is smaller than the determination value Brs, the rich spike signal Srs is OFF (0). Meanwhile, a counter value Count gradually increases.

At the time of t1, an increase in the output Sout of the NOx ammonia sensor 29 causes an increase in the masking output value Smask. This allows the average NOx outflow amount Anoxsum to reach the determination value Brs. In the embodiment, the rich spike signal Srs is then turned ON (1), and exhaust gas with a rich air-fuel ratio are supplied to the NOx catalyst 23.

Also, in the embodiment, when the rich spike signal Srs is turned ON, the counter value Count is increased up to the first predetermined value A. Then, while exhaust gas with a rich air-fuel ratio are being supplied to the NOx catalyst 23, an amount of NOx released from the NOx catalyst 23 and reduced is calculated, and a value equivalent to this amount is subtracted from the counter value Count. When the counter value Count reaches the second predetermined value B, which is lower than the first predetermined value A, the rich spike signal Srs is turned OFF.

At around the time when a supply of exhaust gas with a rich air-fuel ratio to the NOx catalyst 23 is stopped, the output Sout of the NOx sensor 29 suddenly increases. This is because the ammonia sensor 29 detects ammonia flowing out of the NOx catalyst 23. However, the masking output value Smask does not increase, as the output Sout of the NOx ammonia sensor 29 has been mask-processed.

Also, during the time period when it is determined that ammonia is flowing out of the NOx catalyst 23, and the NOx ammonia sensor 29 is detecting the ammonia concentration, the total NOx outflow amount is not calculated, and remains at zero. Meanwhile, also during this time period, the vehicle running distance D continues to be integrated. As a matter of course, as the total NOx outflow amount Anoxsum is maintained at zero during this time period, the average NOx outflow amount Cnoxout remains at zero.

Meanwhile, as shown at the time of t2, in FIG. 7, the average NOx outflow amount Cnoxout is sometimes higher than the determination value Brs, when the total NOx outflow amount Anoxsum started to be calculated. However, in the embodiment, even the counter value Count becomes higher than a predetermined value L, exhaust gas with a rich air-fuel ratio are supplied to the NOx catalyst 23, provided that the average NOx outflow amount Cnoxout is higher than the determination value Brs.

Namely, provided that the average NOx outflow amount Cnoxout is higher than the determination value Brs, still at the time of t3 shown in FIG. 7, exhaust gas with a rich air-fuel ratio are supplied to the NOx catalyst 23. At the time of t3 shown in FIG. 7, as the average NOx outflow amount Cnoxout is lower than the determination value Brs, exhaust gas with a rich air-fuel ratio are not supplied to the NOx catalyst 23. Meanwhile, at the time of t3 shown in FIG. 8, as the average NOx outflow amount Cnoxout is higher than the determination value Brs exhaust gas with a rich air-fuel ratio are supplied to the NOx catalyst 23.

In the embodiment, an additional processing is executed in order to determine a deterioration of the NOx catalyst 23. More specifically, it is determined whether the NOx catalyst 23 has deteriorated, based on the counter value Count, which was calculated when the average NOx outflow amount Conoxout reached the determination value Brs, and exhaust gas with a rich air-fuel ratio started to be supplied to the NOx catalyst 23. Namely, that the average NOx outflow amount Cnoxout reaches the determination value Brs, while the counter value Count is still remarkably low means that maximum the amount of NOx which the NOx catalyst 23 can absorb has been decreasing. Then, in the embodiment, if the counter value Count is lower than a value C, which is lower than a predetermined value B shown in FIG. 7, when the average NOx outflow amount Cnoxout reaches the determination value Brs, it is determined that the NOx catalyst 23 has deteriorated.

Absorption of sulfur component contained in exhaust gas into the NOx catalyst 23 becomes a cause of a reduction of the maximum NOx amount which the NOx catalyst 23 can absorb (hereinafter referred to as a maximum NOx absorption amount). The sulfur component absorbed in the NOx catalyst 23 is released from the NOx catalyst 23, when a temperature of the NOx catalyst 23 is relatively high and also exhaust gas with a rich air-fuel ratio are supplied to the NOx catalyst 23. More specifically, in order to maintain the maximum NOx absorption amount of the NOx catalyst 23 at a high level, it is required to release the sulfur component absorbed in the NOx catalyst 23 from the NOx catalyst 23 by increasing the temperature of the NOx catalyst 23 and supplying the NOx catalyst 23 with exhaust gas with a rich air-fuel ratio.

According to the embodiment, it is possible to determine whether to increase the temperature of the NOx catalyst 23, and supply the NOx catalyst 23 with exhaust gas with a rich air-fuel ratio, based on the counter value Count. According to this, the maximum NOx absorption amount of the NOx catalyst 23 is efficiently maintained at a high level from the viewpoint of fuel economy.

It should be noted that the items explained referring to FIGS. 7 and 8 are equally applied to the second embodiment.

Figure 9:
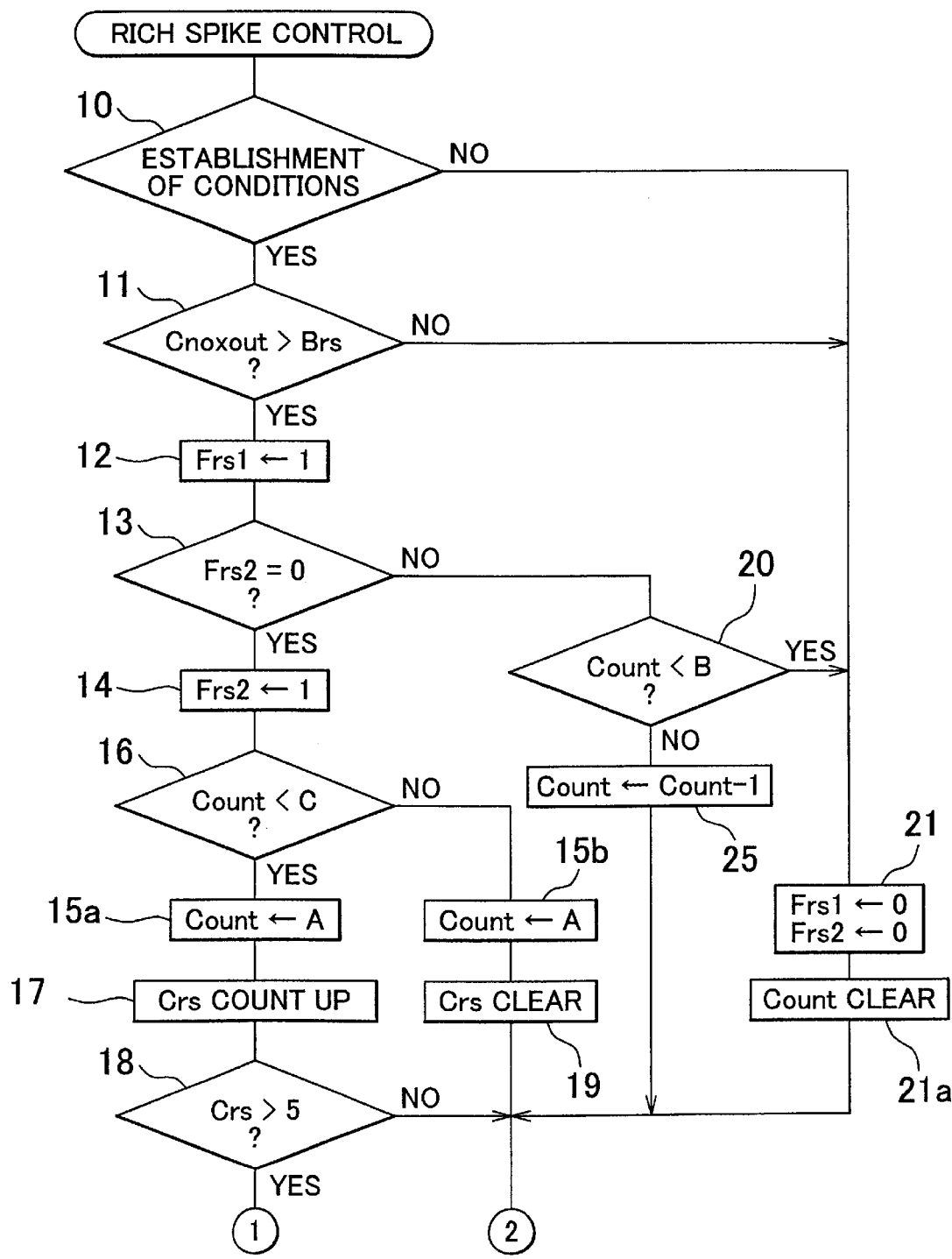
FIG. 9 is a part of the flow chart for executing rich spike control of the first embodiment.
Figure 10:
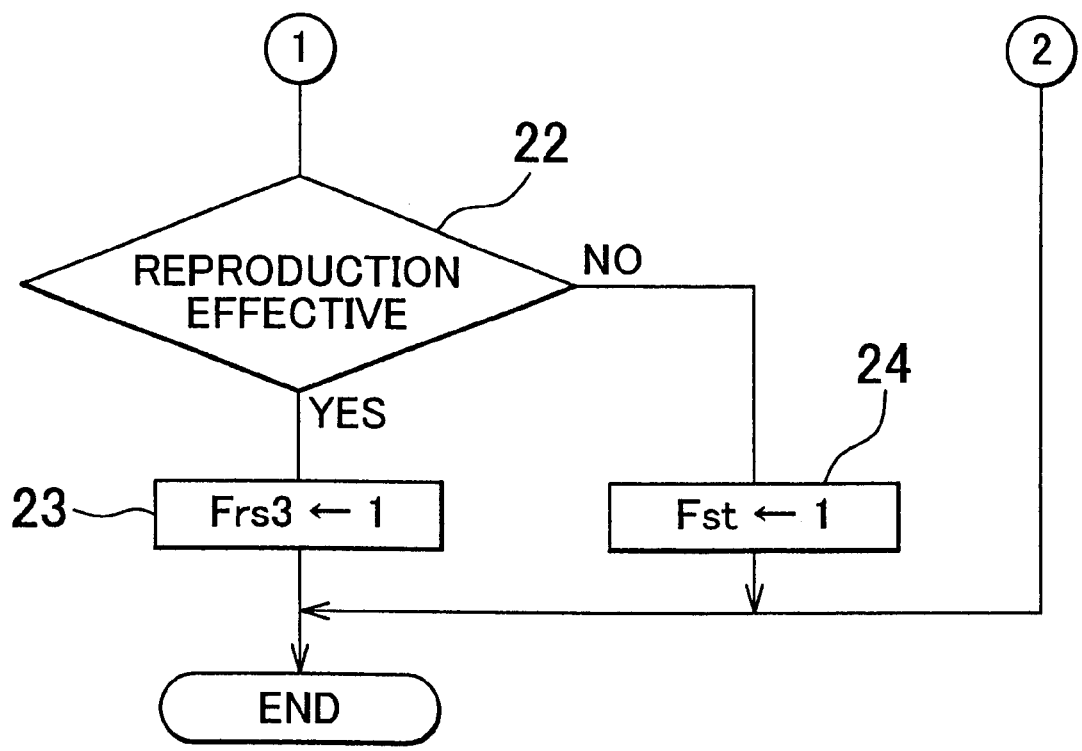
FIG. 10 is a part of the flow chart for executing rich spike control of the first embodiment.

FIGS. 9 and 10 are flow charts for supplying the NOx catalyst with exhaust gas with a rich air-fuel ratio, according to the first embodiment. In the flow shown in FIG. 9, it is initially determined in step 10 whether conditions, where an operation of the internal combustion engine is variable, have been established, in order to supply the NOx catalyst 23 with exhaust gas with a rich air-fuel ratio. When it is determined in step 10 that the conditions have not been established, the routine proceeds on to step 21, flags, Frs1 and Frs 2, which will be explained later in detail, are reset, and the routine is completed. Meanwhile, when it is determined in step 10 that the conditions have been established, the routine proceeds on to step 11.

In step 11, it is determined whether the average NOx outflow amount Cnoxout is higher than the determination value Brs. When Conxout is determined to be equal to or lower than Brs, the routine proceeds on to step 21, flags Frs1 and Frs 2, to be explained later in detail, are reset, and the routine is completed.

Meanwhile, in step 11, when Cnoxout is determined to be higher than Brs, the routine proceeds on to step 12, and a rich spike flag Frs 1 is set. The rich spike flag Frs1 is used to provide instructions to supply the NOx catalyst 23 with exhaust gas with a rich air-fuel ratio in order to release NOx from the NOx catalyst 23 and reduce it, that is, to execute the rich spike. More specifically, when the rich spike flag Frs1 is set, the rich spike processing for supplying the NOx catalyst 23 with exhaust gas with a rich air-fuel ratio is executed in order to release NOx from the NOx catalyst 23 and reduce it. Then, when the rich spike processing is completed, the rich spike flag Frs1 is reset.

Subsequently, the routine proceeds on to step 13, and whether a determination flag Frs2 has been set is determined. The determination flag Frs 2 is used for determining whether the routine executes step 13, for the first time or for the second time or thereafter since the rich spike execution was started.

When the Frs 2 is determined to be equal to 0, that is, determined that the routine executes step 13 for the first time since the rich spike execution was started in step 13, the routine proceeds on to step 14, and the determination flag Frs 2 is set.

Subsequently, in step 16, it is determined whether the counter value Count, which is equivalent to the total NOx absorption amount calculated theoretically according to an operational state of the internal combustion engine, is lower than the predetermined value C. When it is determined in step 16 that Count is lower than C, that is, there is a possibility that the NOx catalyst 23 has deteriorated due to absorption of sulfur component, the routine proceeds on to step 15a. In step 15a, the counter value Count is considered as a predetermined value, A. Then, the routine proceeds on to step 17, and a degradation counter Crs for counting the number of times that the NOx catalyst 23 is determined as having deteriorated due to absorption of sulfur component, is counted up.

Then, in step 18, it is determined whether the degradation counter Crs is higher than a predetermined value, which is 5 in this flow chart, that is, the number of times that the NOx catalyst 23 is determined as having deteriorated due to absorption of sulfur component is more than 5. When Crs is determined to be more than 5 in step 18, the routine proceeds on to step 22. In step 22, in order to allow sulfur component to be released from the NOx catalyst 23, it is determined whether a sulfur component is released from the NOx catalyst 23 with reliability when a temperature of the NOx catalyst 23 is increased and also exhaust gas with a rich air-fuel ratio are supplied to the NOx catalyst 23, that is, whether a reproduction processing is effective of reproducing the deterioration of the NOx catalyst 23 due to absorption of sulfur component when the reproduction processing of the NOx catalyst 23 is executed.

In step 22, when a reproduction processing is determined to be effective, the routine proceeds on to step 23, and a reproduction flag Frs 3 is set. The reproduction flag Frs 3 is used to increase a temperature of the NOx catalyst 23 and also supply the NOx catalyst 23 with exhaust gas with a rich air-fuel ratio, in order to allow sulfur component to be released from the NOx catalyst 23. Namely, when the reproduction flag Frs3 is set, the reproduction processing is executed to increase a temperature of the NOx catalyst 23 and also to supply the NOx catalyst with exhaust gas with a rich air-fuel ratio, in order to allow sulfur component to be released from the NOx catalyst 23. Then, when the reproduction processing is completed, the reproduction flag Frs 3 is reset.

Meanwhile, in step 22, when it is determined that the reproduction processing is not effective, the routine proceeds on to step 24, and a stoichi flag Fst for providing instructions to execute a combustion of fuel in the combustion chamber of the internal combustion engine at a stoichiometric air-fuel ratio. This means that when the stoichi flag Fst is set, an operating state in the internal combustion engine is modified so that the combustion of fuel in the combustion chamber is executed at the stoichiometric air-fuel ratio. This processing executed taking into consideration that an amount of NOx flowing into the NOx catalyst 23 should be minimized, and deterioration of exhaust emission should be suppressed, when the NOx catalyst 23 cannot be reproduced effectively. When deterioration of the NOx catalyst 23 is reproduced, the stoichi flag Fst is reset, and the operation of the internal combustion engine is controlled according to a normal control processing.

Meanwhile, when Count is determined as being equal to or more than C, in step 16, the routine proceeds on to step 15b. In step 15b, the counter value Count is considered as a predetermined value A. Then, the routine proceeds on to step 19, the degradation counter Crs is cleared, and the routine is completed.

Also, in step 13, when Frs 2 is determined as being equal to 1, that is, it is determined that the routine executes step 13 for the second time or thereafter since the rich spike execution was started, the routine proceeds on to step 20. In step 20, it is determined whether the counter value Count has become lower than a predetermined value B, which is higher than the above-mentioned predetermined value C but lower than the above-mentioned predetermined value A.

In step 20, when Count is determined as being equal to or more than B, the routine is subtraction-processed in step 25 and the routine is completed. In this case, the rich spike processing continues. Meanwhile, in step 20, when Count is determined as being less than B, the flags Frs1 and Frs 2 are reset. Namely, the rich spike processing is completed. Subsequently, in step 21a, the counter value Count is cleared.

According to an embodiment of the above-mentioned invention, a total NOx amount absorbed in the NOx catalyst is estimated based on an average NOx outflow amount obtained while a vehicle runs for a predetermined distance. Also, the total NOx amount absorbed in the NOx catalyst is estimated based on the average NOx outflow amount obtained during a predetermined time period.

Namely, according to the above-mentioned inventions, the total NOx amount absorbed in the NOx catalyst is not estimated based on an instantaneous NOx outflow amount from the NOx catalyst. Therefore, according to these inventions, the total NOx amount absorbed in the NOx catalyst is more precisely estimated based on a NOx concentration in exhaust gas flowing out of the NOx catalyst. It should be noted that the total NOx amount can also be estimated based on an average NOx outflow amount obtained while the internal combustion engine rotates for a predetermined number.

What is claimed is:

1. An exhaust emission control apparatus of an internal combustion engine mounted on a vehicle comprising:
    a NOx catalyst that absorbs NOx in exhaust gas when an air-fuel ratio of the exhaust gas emitted from the internal combustion engine is lean, and releases the absorbed NOx to reduce and purify the released NOx by hydrocarbon in the exhaust gas when the air-fuel ratio of the exhaust gas is rich;
    a NOx sensor that detects a NOx concentration in the exhaust gas flowing out of the NOx catalyst; and
    a control portion that calculates a total NOx amount of NOx flowing out of the NOx catalyst while the vehicle runs for a predetermined distance based on the NOx concentration detected by the NOx sensor, calculates a NOx outflow amount per unit running distance based on the total NOx outflow amount, and supplies the NOx catalyst with exhaust gas with a rich air-fuel ratio when the NOx outflow amount per unit running distance exceeds a predetermined amount;
    wherein said control portion comprises a NOx emission amount integrating portion for integrating NOx amounts emitted from the internal combustion engine, and prohibits a supply of exhaust gas with a rich air-fuel ratio to the NOx catalyst even the NOx outflow amount per the unit running distance exceeds the predetermined amount when a NOx emission amount calculated by the NOx emission amount integrating portion is smaller than a predetermined amount.

2. The exhaust emission control apparatus according to claim 1, wherein:
    the NOx concentration is a value subjected to a mask processing.

3. The exhaust emission control apparatus according to claim 2, wherein:
    the mask processing is executed by the control portion.

4. The exhaust emission control apparatus according to claim 2, wherein:
    the mask processing is low-pass filter.

5. The exhaust emission control apparatus of an internal combustion engine comprising:
    a NOx catalyst that absorbs NOx in exhaust gas when an air-fuel ratio of exhaust gas emitted from the internal combustion engine is lean, and releases the absorbed NOx to reduce and purify the released NOx by hydrocarbon in the exhaust gas when the air-fuel ratio of the exhaust gas is rich;
    a NOx sensor that detects a NOx concentration in the exhaust gas flowing out of the NOx catalyst; and
    a control portion that calculates a total NOx amount of NOx flowing out of the NOx catalyst during a predetermined time period based on the NOx concentration detected by the NOx sensor, calculates a NOx outflow amount per unit time based on the total NOx outflow amount, and supplies the NOx catalyst with exhaust gas with the rich air-fuel ratio when the NOx outflow amount per unit time exceeds a predetermined amount;
    wherein said control portion comprises a NOx emission amount integrating portion for integrating NOx amounts emitted from the internal combustion engine, and prohibits a supply of exhaust gas with a rich air-fuel ratio to the NOx catalyst even a NOx outflow amount per the unit time exceeds the predetermined amount when a NOx emission amount calculated by the NOx emission amount integrating portion is smaller than a predetermined amount.

6. The exhaust emission control apparatus according to claim 5, wherein:
    the NOx concentration is a value subjected to mask processing.

7. The exhaust emission control apparatus according to claim 6, wherein:
    the mask processing is executed by the control portion.

8. The exhaust emission control apparatus according to claim 6, wherein:
    the mask processing is low-pass filter.

9. The exhaust emission control apparatus of an internal combustion engine comprising:
    a NOx catalyst that absorbs NOx in exhaust gas when an air-fuel ratio of the exhaust gas emitted from the internal combustion engine is lean, and releases the absorbed NOx to reduce and purify the released NOx by hydrocarbon in the exhaust gas when the air-fuel ratio of the exhaust gas is rich;
    a NOx sensor that detects a NOx concentration in the exhaust gas flowing out of the NOx catalyst; and
    a control portion that calculates a total NOx amount of NOx flowing out of the NOx catalyst during a predetermined number of rotations of engine based on the NOx concentration detected by the NOx sensor, calculates a NOx outflow amount per unit number of rotations of engine based on the total NOx outflow amount, and supplies the NOx catalyst with exhaust gas with a rich air-fuel ratio when the NOx outflow amount per unit engine speed exceeds a predetermined amount;

wherein said control portion comprises a NOx emission amount integrating portion for integrating NOx amounts emitted from the internal combustion engine, and prohibits a supply of exhaust gas with a rich air-fuel ratio to the NOx catalyst even the NOx outflow amount per unit number of rotations of engine exceeds the predetermined amount when the NOx emission amount calculated by the NOx emission amount integrating portion is smaller than a predetermined amount.

10. The exhaust emission control apparatus according to claim 9, wherein:

the NOx concentration is value subjected to mask processing.

11. The exhaust emission control apparatus according to claim 10, wherein:

the mask processing is executed by the control portion.

12. The exhaust emission control apparatus according to claim 11, wherein:

the mask processing is low-pass filter.

13. A control method for a exhaust emission control apparatus of an internal combustion engine includes a NOx catalyst that absorbs NOx in exhaust gas when an air-fuel ratio of the exhaust gas emitted from the internal combustion engine is lean, and releases the absorbed NOx to reduce and purify the released NOx by hydrocarbon in the exhaust gas when the air-fuel ratio of the exhaust gas is rich, mounted on a vehicle comprising the step of:

calculating a NOx outflow amount per unit running distance based on a total amount of NOx outflowed from the NOx catalyst while the vehicle runs for a predetermined distance;

supplying the NOx catalyst with exhaust gas with a rich air-fuel ratio when the NOx outflow amount per unit running distance exceeds a predetermined amount; and integrating NOx amounts emitted from the internal combustion engine prohibiting a supply of exhaust gas with a rich air-fuel ratio to the NOx catalyst even the NOx outflow amount per the unit running distance exceeds the predetermined amount when a NOx emission amount calculated by the NOx emission amount integrating portion is smaller than a predetermined amount.

14. A control method for a exhaust emission control apparatus of an internal combustion engine includes a NOx catalyst that absorbs NOx in exhaust gas when an air-fuel ratio of the exhaust gas emitted from the internal combustion engine is lean, and releases the absorbed NOx to reduce and purify the released NOx by hydrocarbon in the exhaust gas when the air-fuel ratio of the exhaust gas is rich comprising the step of:

calculating a NOx outflow amount per unit time based on a total amount of NOx outflowed from the NOx catalyst during a predetermined time period;

supplying the NOx catalyst with exhaust gas with a rich air-fuel ratio when the NOx outflow amount per unit time exceeds a predetermined amount;

integrating NOx amounts emitted from the internal combustion engine; and prohibiting a supply of exhaust gas with a rich air-fuel ratio to the NOx catalyst even the NOx outflow amount per the unit time exceeds the predetermined amount when a NOx emission amount calculated by the NOx emission amount integrating portion is smaller than a predetermined amount.

15. A control method for a exhaust emission control apparatus of an internal combustion engine includes a NOx catalyst that absorbs NOx in exhaust gas when an air-fuel ratio of the exhaust gas emitted from the internal combustion engine is lean, and releases the absorbed NOx to reduce and purify the released NOx by hydrocarbon in the exhaust gas when the air-fuel ratio of the exhaust gas is rich, comprising the step of:

calculating a NOx outflow amount per unit number of rotations of engine based on a total amount of NOx outflowed from the NOx catalyst during a predetermined number of rotations of engine;

supplying the NOx catalyst with exhaust gas with a rich air-fuel ratio when the NOx outflow amount per unit time exceeds a predetermined amount;

integrating NOx amounts emitted from the internal combustion engine; and prohibiting a supply of exhaust gas with a rich air-fuel ratio to the NOx catalyst even the NOx outflow amount per unit number of rotations of engine exceeds the predetermined amount when a NOx emission amount calculated by the NOx emission amount integrating portion is smaller than a predetermined amount.

* * * * *